Feb. 4, 1941.　　　　E. C. READ　　　　2,230,263
GOVERNOR
Filed Jan. 18, 1939　　　8 Sheets-Sheet 2

INVENTOR.
Everett C. Read
BY
John W. Michael
ATTORNEY.

Feb. 4, 1941. E. C. READ 2,230,263
GOVERNOR
Filed Jan. 18, 1939 8 Sheets-Sheet 4

Fig. 6.

INVENTOR.
Everett C. Read
BY John W. Michael
ATTORNEY.

Feb. 4, 1941.   E. C. READ   2,230,263
GOVERNOR
Filed Jan. 18, 1939   8 Sheets-Sheet 6

INVENTOR.
EVERETT C. READ
BY John W. Michael
ATTORNEY.

Feb. 4, 1941.  E. C. READ  2,230,263

GOVERNOR

Filed Jan. 18, 1939  8 Sheets-Sheet 8

INVENTOR.
Everett C. Read
BY John W. Michael
ATTORNEY

Patented Feb. 4, 1941

2,230,263

UNITED STATES PATENT OFFICE 2,230,263

GOVERNOR

Everett C. Read, Milwaukee, Wis., assignor to The Filer & Stowell Co., Milwaukee, Wis., a corporation of Wisconsin Application January 18, 1939, Serial No. 251,460

32 Claims. (Cl. 121—162)

This invention relates in general to steam engines and more particularly to the governing and lubricating systems thereof.

One of the objects of the invention is to obtain a close regulation over the speed of the engine and to accomplish this hydraulically and with a structure which is simple, compact, and durable, and yet may be practically and economically adapted to respond to the conditions which it is desirable to serve.

Another object of the invention is to provide an engine of this character and which utilizes the instrumentalities functioning to provide the hydraulic governor for the further purpose of aiding in the lubrication of the bearings or lubricating points of the engine.

In one embodiment of the invention the speed of the engine is controlled by a centrifugal inertia type governor having a fluid pressure motor combined therewith after the manner of a hydraulic relay. The governor controls the displacement of the steam eccentric which in turn imparts the movement to the steam valve so as to produce a cut-off corresponding to any existing load.

The fluid under pressure is supplied to the motor by means of a pump which may be driven from the engine shaft. Pressure relief means is combined with the fluid pressure supply means and is governed in its action by a control device which is responsive to a characteristic of the performance of the engine which varies as a function of the load thereon. For example, the pressure relief means may include a suitable piping and valve arrangement including an oil control valve which is open and closed under the control of a speed responsive device driven from the engine shaft or under the dual control of such a speed responsive device and of a pressure responsive device governed in its action by the back pressure in the exhaust line of the steam engine.

The invention also proposes to combine lubricant conveying devices with the fluid pressure motor and with the pressure relief means so that the venting of the oil which is essential to the control had over the fluid pressure motor is made to serve the further useful purpose of lubricating the bearing surfaces of the engine. This combination of the lubricant conveying devices with the governor system introduces a safety feature into the structure in that if the oil pressure is not sufficient to insure proper lubrication of the bearing surfaces of the engine, then the cutoff will be automatically decreased to such extent as to cause the engine to idle. In other words, under such conditions the engine can not be operated to carry a load and is automatically protected.

Other objects and advantages reside in certain novel features of the construction, arrangement, and combination of parts which will be hereinafter more fully described and particularly pointed out in the appended claims, reference being had to the accompanying drawings forming a part of this specification and in which:

Referring to the drawings, it will be seen that both embodiments of the invention are applied to a steam engine designated generally at 1, but only fragments of which are shown. The engine 1 has a housing 2 enclosing and supporting the bearings 3 which support the main shaft or crank shaft 5 of the engine. The crank shaft 5 has a crank 6 connected by means of a connecting rod 7 to a cross head 8 which is actuated from the piston (not shown) of the engine in the usual way. The speed of the engine is controlled by a distributing valve (not shown) and more especially by varying the point of cut-off of the distributing valve in accordance with the well known practice. The distributing valve is actuated by suitable valve gear shown (see Figure 3) as including a rocker arm 10 actuated by means of an eccentric rod 11 extending from an eccentric strap 12. The eccentric strap 12 is fitted about an eccentric sheave 13 which is shifted relative to the main shaft of the engine to vary the point of cut-off.

Figures 3, 4, 5:
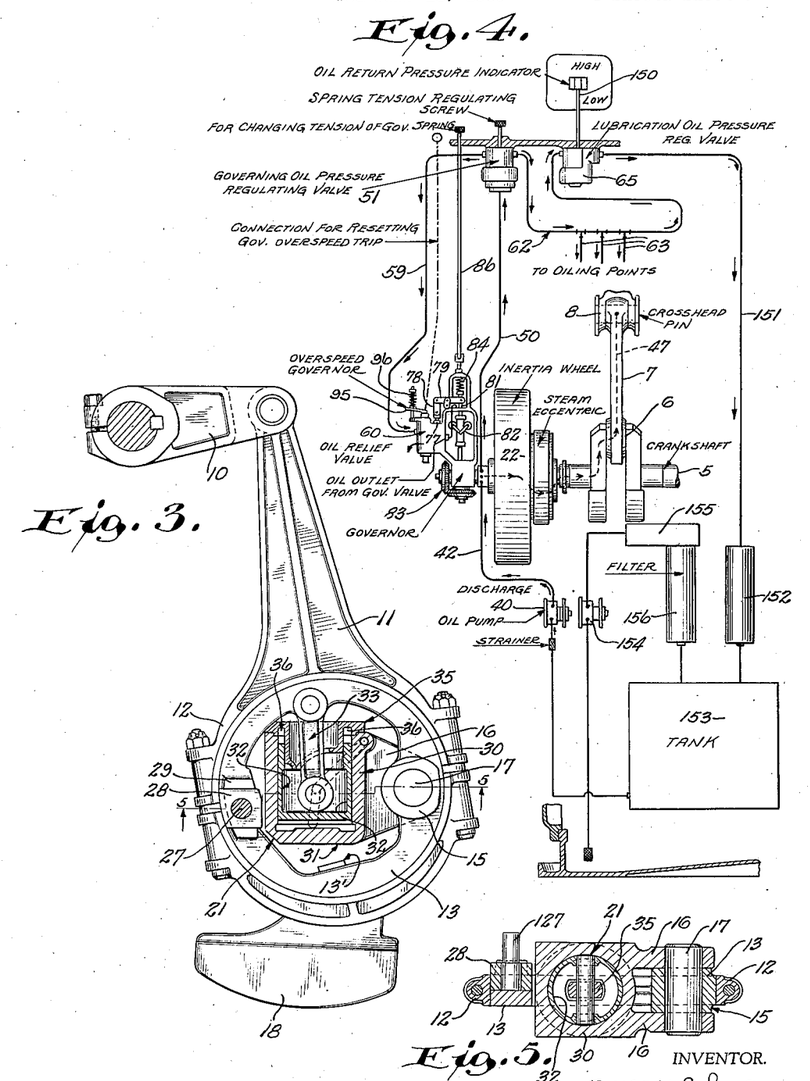
Figure 3 is a view in transverse vertical section taken on line 3—3 of Figure 1.
Figure 4 is a diagrammatic view illustrating the circulation of the coil through the governor and through the lubricating system of the engine.
Figure 5 is a view in horizontal cross section taken on line 5—5 of Figure 3.
Figure 6:
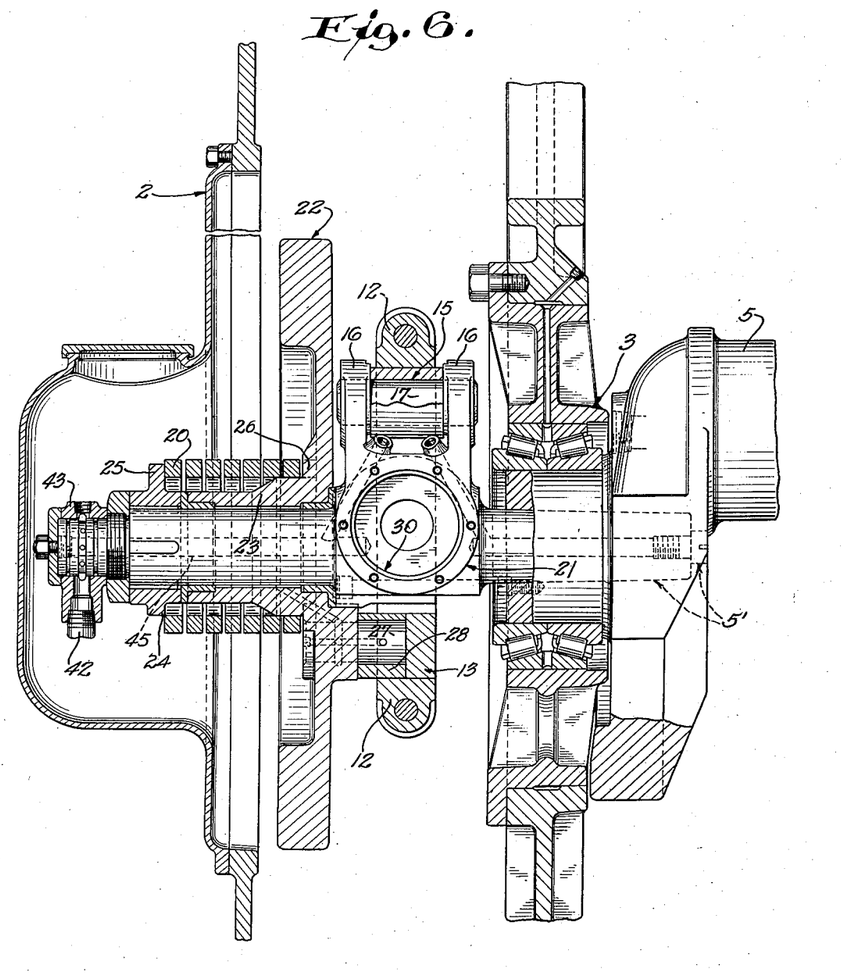
Figure 6 is a view in horizontal cross section taken on line 6—6 of Figure 1.
Figures 7, 9:
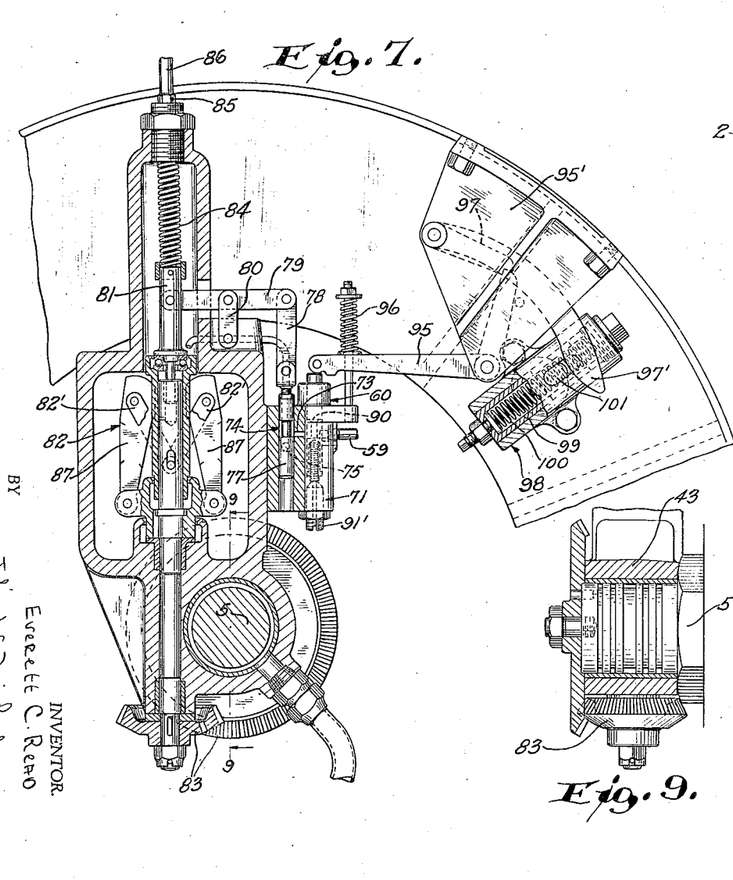
Figure 7 is a view in end elevation showing the over speed governor.
Figure 9 is a fragmentary detail view taken on line 9—9 of Figure 7.
Figure 8:
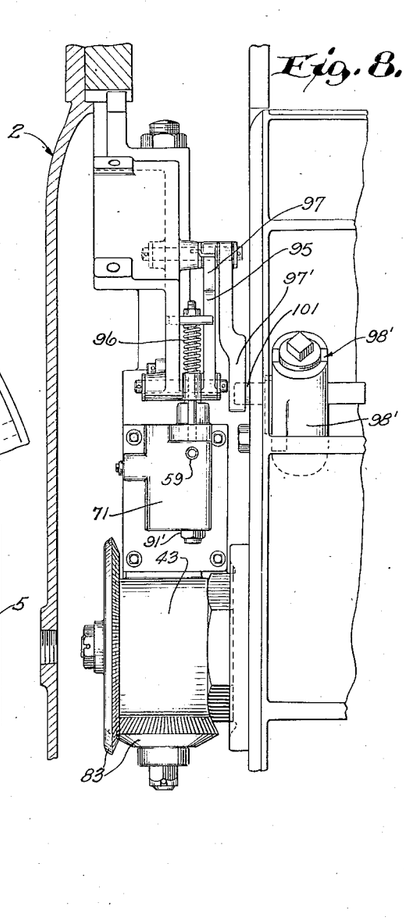
Figure 8 is a view in side elevation of the parts shown in Figure 7.

For this purpose, the eccentric sheave 13 has a portion provided with a transverse bearing 15, which bearing is disposed between an apertured and bifurcated bracket member 16 formed as a rigid part of the crank shaft of the engine (see Figures 3, 5 and 6). A supporting pin 17 extends through the apertures of the bracket arms and through the bearing 15 to pivotally support or fulcrum the eccentric on the main shaft of the engine. The combined weight of the eccentric sheave 13 and part of the eccentric strap 12, together with extra weights 18 suitably connected to the eccentric sheave 13 provide the actual governor weight. The center of gravity of this governor weight is located some distance from the center of the main shaft of the engine, the distance, naturally, changing with the position of the eccentric sheave. Centrifugal force acting on the governor weight provides means for causing the eccentric sheave to swing or shift outwardly with respect to the engine shaft.

Centrifugal force, due to this governor weight, is opposed by means of a torsion spring 20 and by means of a fluid pressure motor designated generally at 21. In the construction shown in the drawings, an inertia wheel designated at 22 is also provided and has its hub portion 23 rotatably fitted on a portion of the engine shaft. One end of the torsion spring 20 abuts a shoulder 24 formed on a collar 25 keyed to the engine shaft while the other end of this spring abuts the shoulder 26 formed on the inertia wheel 22. The inertia wheel 22 is in turn connected to the eccentric sheave 13 by means of a pin 27 fixed to and projecting laterally from the inertia wheel and pivotally interfitted with a slide block 28 which is slidable in a flanged radial guideway 29 provided therefor in the eccentric sheave 13.

The provision of the inertia weight has a number of advantages but it may be omitted, leaving some structure equivalent to its hub, pin and block provide a connection between the torsion spring 20 and the eccentric sheave 13.

The fluid pressure motor 21 comprises a cylinder 30 rigid with the engine shaft 5. For convenience of manufacture the end section of the crank shaft in which the cylinder 30 and sheave bracket 16 are formed may be a separate suitably machined casting which is however rigidly attached to the other section of the crank shaft in some suitable way, as indicated generally at 5' in Figure 6. The cylinder 30 has one end open and one end closed by an integral head 31. A piston 32 is fitted in the cylinder 30. A link 33 has one end connected to the piston adjacent its head and has its opposite end pivotally connected to the eccentric sheave. The link 33 extends through a cap or fitting 35 surrounding the open end of the cylinder and having an annular groove 36 in which the skirt of the piston works to provide a dash pot or dampening means for the motor.

With a construction as thus far described and oil under pressure supplied to the space between the head of the cylinder and the head of the piston and with the engine not running, the eccentric sheave will assume a position wherein its pad 13' will bear against the outer face of the head 31 of the cylinder. This position of the eccentric sheave corresponds to maximum cut-off. After the engine has come up to almost normal speed, centrifugal force has increased to such an extent that it now balances the combined tension of the torsion spring 20 and the existing oil pressure under the piston 32. The eccentric is moved in to decrease the cut-off until the steam admitted to the cylinder corresponds to the present load.

The inertia wheel 22 connected by the pin and sliding block to the eccentric sheave absorbs the cyclic impulses in the eccentric due to the inertia of the reciprocating parts of the valve gear. Moreover, this inertia wheel performs another function in that it assists the governor in changing the position of the eccentric sheave for sudden changes in the load of the engine.

For instance, if an increase in load is suddenly applied to the engine, the crank shaft slows down but the inertia wheel tends to run at its constant speed. Part of the energy stored up in the inertia wheel, that is, the energy corresponding to the difference between the higher speed before the load was applied and the lower speed to which the engine has slowed down, is then automatically applied for moving the eccentric sheave to a new position giving a longer cut-off. The reverse will take place if the load is suddenly increased. It should be appreciated however, that the inertia wheel is not absolutely essential to enable the governor to perform its functions of controlling and stabilizing the position of the eccentric sheave, but the inertia wheel is advantageous in that it provides a simple and practical supplemental means to help make the changes more quickly.

In the description of the operation just concluded we have assumed that the oil pressure under the piston is constant. A still closer regulation can be accomplished by the introduction of means for varying the oil pressure under the piston to such an extent that for any change in load the oil pressure is changed correspondingly in the same instant. Several such means will now be described.

Figure 1:
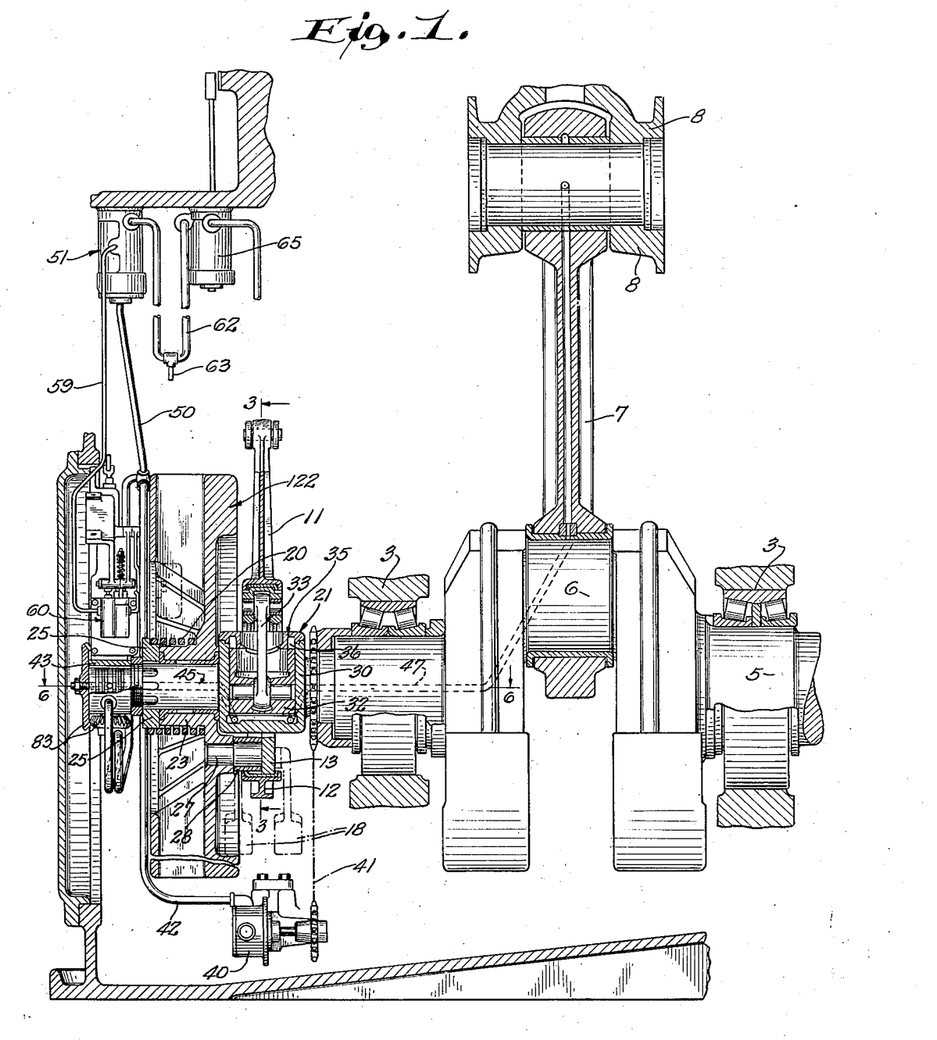
Figure 1 is a fragmentary view partly in longitudinal central vertical section and partly in side elevation showing a fragment of a steam engine of the vertical type equipped with a governor and lubricated in accordance with the present invention.
Figures 2, 10:
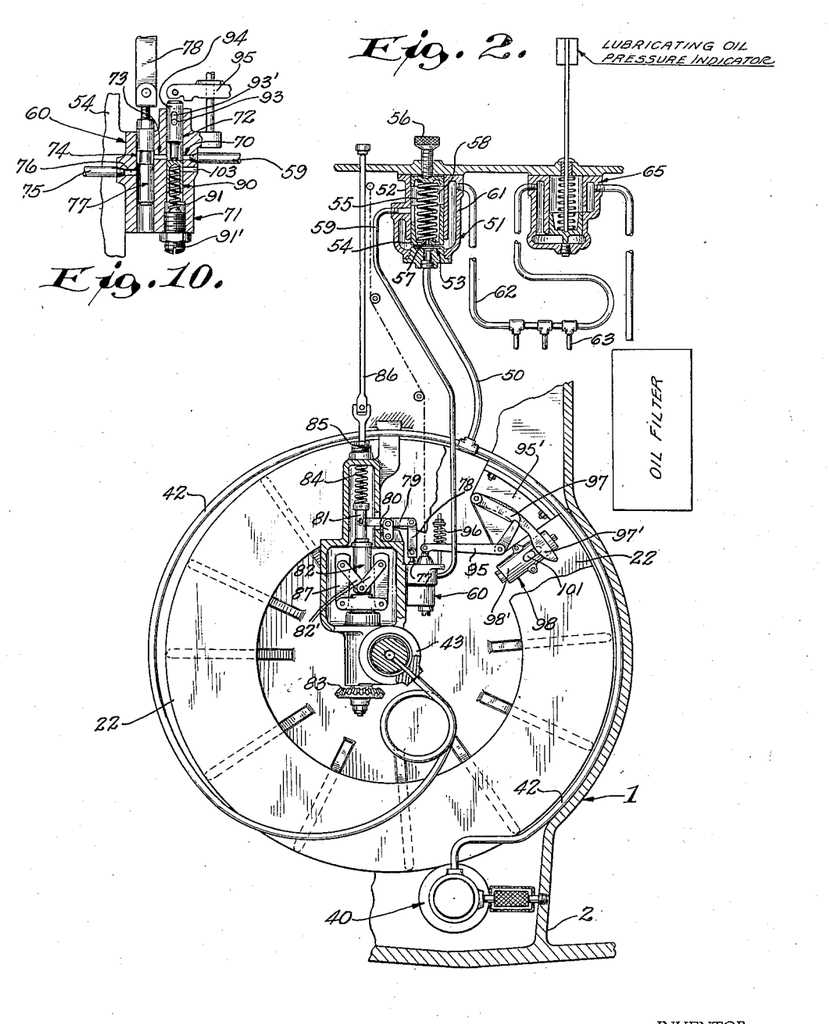
Figure 2 is a view looking toward the left hand side of Figure 1, the end portion of the housing being removed and parts being broken away and shown in section for the sake of illustration.
Figure 10 is a fragmentary detail sectional view but illustrating the oil relief valve for the pressure relieving means of the governor.

Referring now to Figures 1, 2 and 4, the present invention proposes to provide an oil pump 40 located in the sump of the crank case and driven by means of chain and sprocket gearing 41 from the engine shaft. The outlet of the pump discharges into a pipe line 42 which may be of tubing and which in turn connects to a distributing or manifold ring 43 which surrounds an annularly grooved end portion of the engine shaft 5. The ring 43 is suitably packed so that the oil delivered to the grooves in the engine shaft will flow through radial passages therein into a longitudinal duct 45 which communicates with the space between the head of the piston and the head of the cylinder. This space also communicates with a duct or passage 47 which leads to the connecting rod and cross head bearings to provide for a restricted discharge from the motor 21 and also lubricate certain bearing surfaces of the engine.

A branch line 50, also of tubing, leads from the oil line 42 to a governor oil pressure regulating valve designated generally at 51. The valve 51 comprises a casing 52 having a valve seat 53 with which a poppet valve 54 coacts. The branch 50 connects with the portion of the valve on which the seat 53 is formed so that when the poppet valve is engaged with the seat, flow of oil through the branch into the valve 51 is stopped. The poppet valve 54 is loaded by means of a spring 55 whose tension may be adjusted by means of an adjusting screw 56. Its head is provided with a small port 57 which permits the pressure from the branch 50 to pass onto the opposite side of the valve from its seat and into a chamber 58. The chamber 58 connects with a pipe line 59 which leads down to an oil relief valve arrangement designated generally at 60 and controlled as to its action by a speed responsive device.

The chamber 58 is surrounded by a jacket 61 which communicates with the branch 50 when the valve is open. This jacket connects with a pipe 62 which has branches 63 leading to the point to be lubricated. A lubricating oil pressure regulating valve designated at 65 connects up with the pipe 62 and regulates the pressure in the lubricating system of the engine served by the pipe 62.

The pressure in the governing system is determined by the tension of the spring 55 and the oil pressure above the poppet valve 54. In other words, the force due to the oil pressure acting under the valve is balanced by the spring tension plus the oil pressure above the valve. Hence the oil pressure in the governing system which is acting on the piston 32 of the fluid pressure motor 21 can be regulated within wide limits by varying the oil pressure acting on top of the valve 54. Such variation of the oil pressure acting on top of the valve 54 is effected by more or less restricting the flow of oil from the space above the valve and the means provided for such purposes in the present instance is the oil relief valve arrangement 60 and the control device which regulates its action.

The lower end of the pipe 59 is connected to the intake port 70 of the casing 71 of the oil relief valve arrangement 60. (See Figures 2, 4, 7 and 10.) This port 70 is normally in open communication with an overspeed valve chamber 72 provided in the casing 71 and this chamber 72 in turn communicates with an intermediate passage or port 73 leading to the oil relief valve chamber 74. A discharge pipe 75 conducts the oil from the oil relief valve chamber 74 back to the sump in the lower part of the engine housing or crank case. A balanced piston valve 77 controls the flow of oil from the passage 73 to the discharge pipe 75. The upper end of the valve 77 projects above the casing and is suitably connected with the lower end of a link 78 which has its upper end pivotally connected with one end of a rock lever 79. The rock lever 79 is fulcrumed intermediate its ends on a supporting link 80 and its end opposite link 78 is suitably connected to the axially movable element or spindle 81 of the centrifugal governor or speed responsive device 82 which may be of any suitable or conventional construction and which is driven by gearing 83 from the crank shaft or main shaft of the engine. The centrifugal governor or speed responsive device 82 is provided with a govenor spring 84 whose tension may be varied by adjusting its tensioning screw 85, rod 86 being provided to facilitate such adjustment.

With this construction, if the engine slows down the weights 87 of the governor or speed responsive device move inwardly toward the vertical axis of the governor thereby pulling downwardly on the governor spindle 81 and rocking the lever 79 to lift the oil relief valve 77 and hence move it toward closed position. This restricts or stops the bleeding or discharge of the oil from above the top of the poppet valve 54 thereby tending to close said valve and building up the pressure in the governing oil system and hence increasing the pressure beneath the piston of the fluid pressure motor 21. As a consequence, the piston of the fluid pressure motor 21 is shifted outwardly to move the eccentric and increase the cut-off to an extent necessary to correspond to the new load conditions.

If the engine speeds up, the governor weights 87 of the speed responsive device 82 move outwardly whereupon their links 82' press upwardly on the governor spindle 81 to cause the rock lever 79 to move the valve 77 to open position thereby decreasing the pressure above the poppet valve 54, allowing more oil to flow through the branch 50 and hence reducing the pressure acting on the piston of the fluid pressure motor 21 to allow centrifugal force to swing the eccentric outwardly and decrease the cut-off to the proper amount.

The present invention also proposes means for preventing the engine running at a higher speed than intended. This means is in the nature of an overspeed governor which is set for about 10% higher speed than the normal speed of the engine. This overspeed governor includes an oil relief valve 90 which is positioned in the chamber 72 of the casing 71 and biased by means of a spring 91 to inoperative or closed position. A stop pin 93 fixed to the casing and operating in a slot 93' of the valve operating plunger 94 coacts with the spring to determine the inoperative position of the valve. A valve operating lever 95 fulcrumed on a bracket 95' carried by the engine has one end overlying the upper end of the valve operating plunger 94 and has an operating spring 96 cooperable therewith and tending to swing the lever 95 to cause it to shift the plunger 94 downwardly to move the valve 90 to an operative position, this spring being stronger than the valve spring 91. Normally, however, the spring 96 is precluded from functioning by means of a latch 97 also pivotally supported on bracket 75' but cooperable with the other arm of the valve operating lever 95. The latch 97 is provided with a laterally offset camming portion 97' which lies in the field of action of a speed responsive trip 98 mounted on the inertia wheel 22. This speed responsive trip comprises a casing or housing 98' bolted to the inertia wheel 22 and having a weighted plunger 99 slidable therein and normally held in its inward position by a spring 100. A lug 101 projects laterally from the plunger out through a slot in the trip housing. When the engine speed increases to 10% above normal, centrifugal force acting on the weighted plunger 99 causes it to move outwardly against the action of its spring 100 and to a position wherein it is effective to engage and cam the latch 97 to a released position thereby allowing the spring biased operating lever 95 to shift the valve 90 to operative position wherein the oil is bled directly from the pipe 59 through the chamber 72 to an overspeed exhaust port 103. This valve also automatically limits the pressure on top of the valve 54 since if the pressure should for any reason exceed that for which the valve is set by the adjusting screw 91' its spring 91 will yield and allow it to automatically open.

Figures 11, 13, 14:
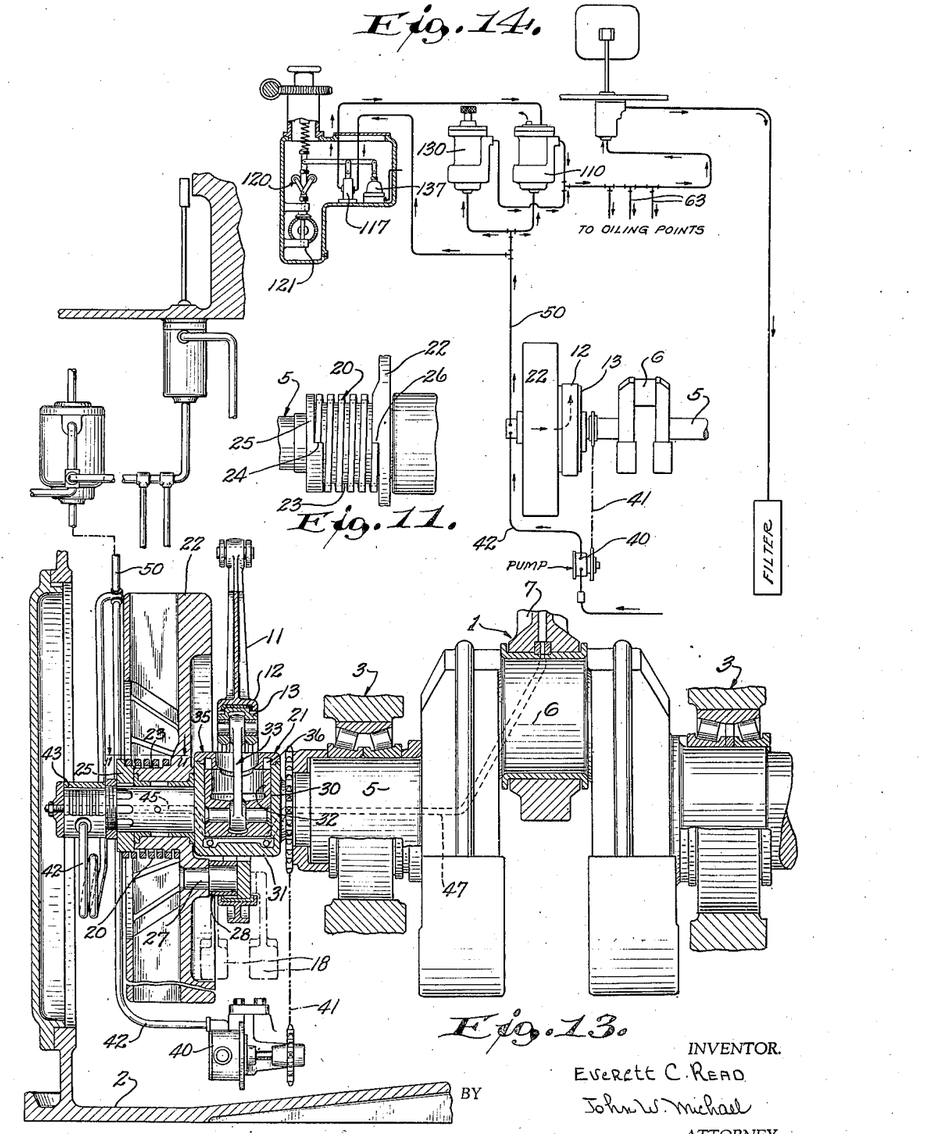
Figure 11 is a fragmentary detail view in elevation illustrating the manner in which the torsion spring is combined with the engine shaft and inertia wheel.
Figure 13 is a view partly in longitudinal vertical section and partly in side elevation further illustrating the structure shown in Figure 12.
Figure 14 is a diagrammatic view showing the circulation of the oil in this modified form of hydraulic governor control.
Figure 12:
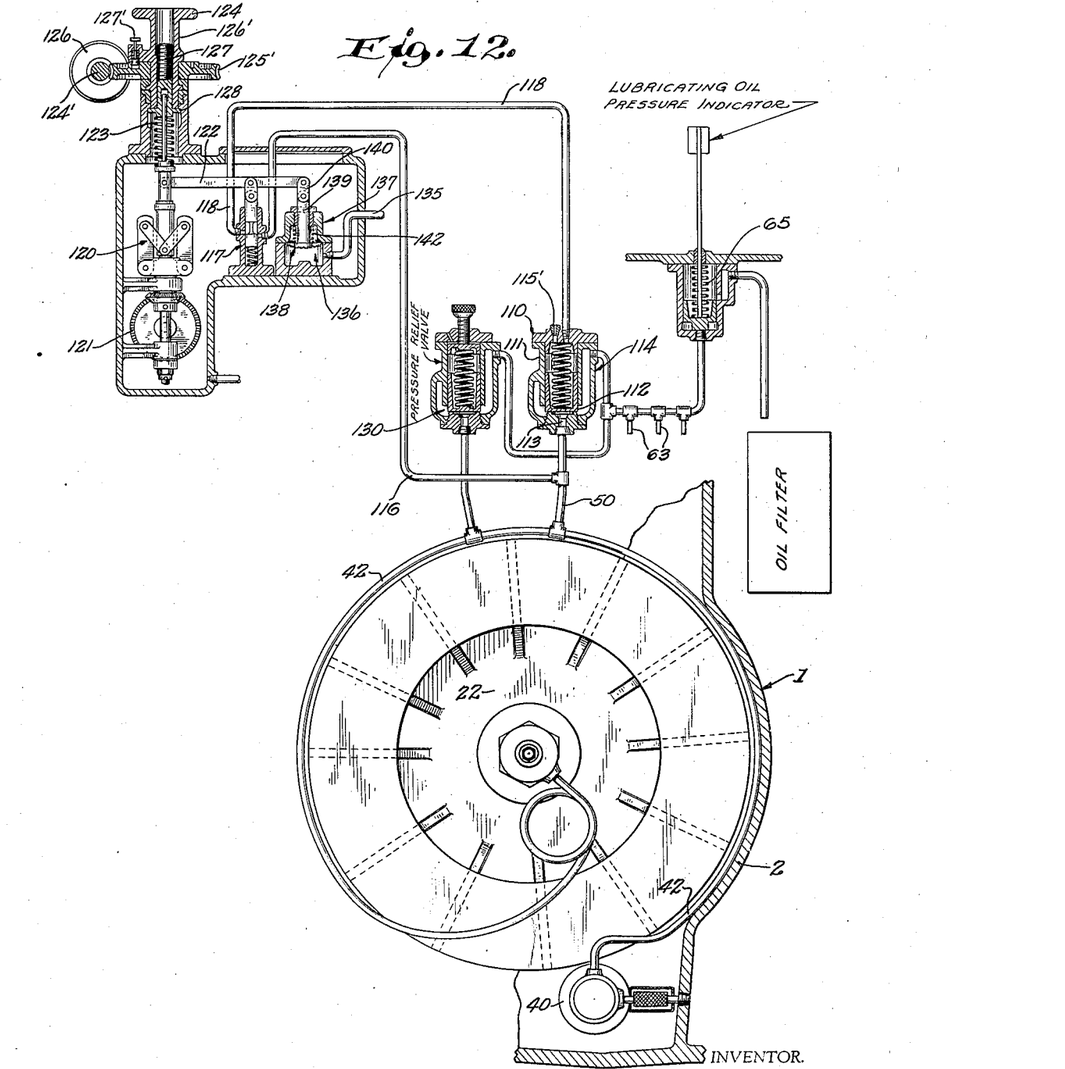
Figure 12 is a diagrammatic view in end elevation showing a modified form of control for the hydraulic governor.

The form of the invention shown in Figures 12 to 14 is identical with that hereinabove described except as to the particulars of the means which varies the oil pressure on the top of the piston valve corresponding in purpose and in function to the piston valve 54 of the pressure regulating valve 51.

As before, the pump 40 delivers the oil under pressure to the conduit 42 and a branch 50 leads from this conduit to a pressure regulating valve designated generally at 110. The pressure regulating valve 110 has a casing 111 in which the spring loaded poppet valve 112 is fitted, the poppet valve 112 coacting with a valve seat 113 with which the branch 50 is connected. A jacket 114 surrounds a portion of the valve casing and is connected to lubricant conveying devices 63 as before. The valve 112 does not however have a port through its head but the casing 111 is provided with a bleed hole or port 115' on the top side of the valve. Pressure is supplied to the top side of the valve from the branch 50 under the control of an oil control valve 117. For this purpose a pipe line 116 leads from the branch 50 to the inlet of the valve 117. The outlet from this valve is coupled to a pipe line 118 which leads to the pressure regulating valve 110 and communicates with the interior thereof on the top side of the poppet valve 112. The position of the oil control valve 117 is regulated by means of a centrifugal governor or speed responsive device 120 similar in its construction to the speed responsive device 92 and driven by means of suitable gearing 121 from the engine shaft 5. The spindle of this governor 120 is operatively connected to the valve 117 by means of a valve operating lever 122.

With a construction as thus far described, when the engine slows down the governor weights of the speed responsive device 120 move in toward the governor spindle lowering the valve 117 which opens or increases the passage through the valve to the top of the poppet valve 112 of the pressure regulator 110. This necessarily builds up the pressure on the top of the poppet valve 112 and moves it down toward its seat, restricting the flow of oil through the pressure regulating valve 110 to the lubricant conveying devices and hence raising the pressure of the oil under the piston 32 of the fluid pressure motor 21. This increase of pressure forces the piston 32 out, and the eccentric sheave 13 swings to a position corresponding to the new load condition. The speed of the engine can be adjusted very closely by changing the tension of the spring 123 of the governor or speed responsive device 120. Variation in tension of the spring 123 may be effected either manually by means of turning the knob 124, or by means of a small electric motor 126 acting through worm 124' and worm wheel 125' to drive the sleeve 126' on which the knob 124 is formed. The worm wheel 125' and sleeve 126' are releasably interconnected by means of a detent 127'. The sleeve 126' is swiveled in its supporting member and is internally threaded to engage an adjusting screw 127 for the governor spring, the screw 127 being constrained to rectilinear motion by keys and keyways 128.

An adjustable pressure relief valve 130 is connected to the lubricant conveying devices in parallel relation with the pressure regulating valve and limits the speed of the engine to a R. P. M. corresponding to the maximum allowable output from the generator.

A governor system constituted as thus far described would give the engine a constant speed at all loads. In instances where the generator output and engine load are to be governed by the pressure in the exhaust line of the engine and where the engine is utilized as a prime mover for an induction generator it may be desirable to further modify the control for the reason that the output of the induction generator depends on the speed above the synchronous (specified synchronous speed 450 R. P. M. and full load speed 460 R. P. M.). The pressure in the engine exhaust line is, under such conditions, utilized and acts on the governing means as follows:

A pipe 135 connects the engine exhaust line with the chamber 136 of a pressure responsive device 137. The top wall of this chamber 136 is defined by a diaphragm 138 which is operatively connected to a rod 139 projecting exteriorly of the pressure responsive device and connected by means of a link 140 to the valve operating lever 122 so as to provide an adjustable fulcrum for this lever. The diaphragm is biased downwardly in the piston chamber 136 by means of a spring 142. If the back pressure increases, the diaphragm moves upwardly compressing the spring, until the forces on both sides of the diaphragm are equalized. Thus the fulcrum point of the operating lever 122 is displaced correspondingly in closing the valve 118. The speed of the engine will then drop and the governor weights take a new position corresponding to the decrease in speed. If on the other hand, the back pressure goes down, the diaphragm will move down due to the spring force on its upper side. Consequently, the fulcrum point is lowered and the valve 117 opens, the oil pressure on the top of the valve 112 increases and the engine speeds up and the governor weights 120 and governor spindle take a new position corresponding to the speed.

When the engine is running under a constant load and speed, the valve 112 is always slightly open admitting oil to the top side of the valve in order to make up for the amount which is bled through the vent 115'.

As shown in Figure 4 and to some extent also in Figure 14, the oil is taken by the pump 40 from the lubricating oil compartment in the engine housing and is discharged into the passages in the engine shaft 5 in which it passes on to the fluid pressure motor 21. Some of the oil discharged from the fluid pressure motor passes to the crank pin bearing and then up the connecting rod to the cross head pin bearing and cross head. The pressure in this part of the lubricating system varies within the limits required for the governing.

In the other branch 50 of the discharge line from the pump the oil goes through the oil pressure regulating valve 51 or 110, as the case may be, and after the oil is passed through the valve it is distributed through the branch lines 63 to the different points to be lubricated, such as the main bearing, crank shaft, etc. The pressure in this part of the lubricating system is controlled by the lubricating oil pressure regulating valve 65 which, as indicated, usually has a gauge or indicator 150 associated therewith. The oil not used for the bearings or bearing surfaces goes back through the return line 151 to filters 152 and is then delivered back to the oil compartment or tank 153. The portion of the oil which is lubricating the bearings and other parts accumulates in the bottom of the crank case or housing 2. A second pump 154 also driven from the engine shaft pumps this oil into a settling compartment provided in the engine frame and indicated diagrammatically at 155 in Figure 4. From this compartment 155 the oil flows through one or more filters 156, back into the clean oil compartment or tank 153.

Figures 15, 16, 17:
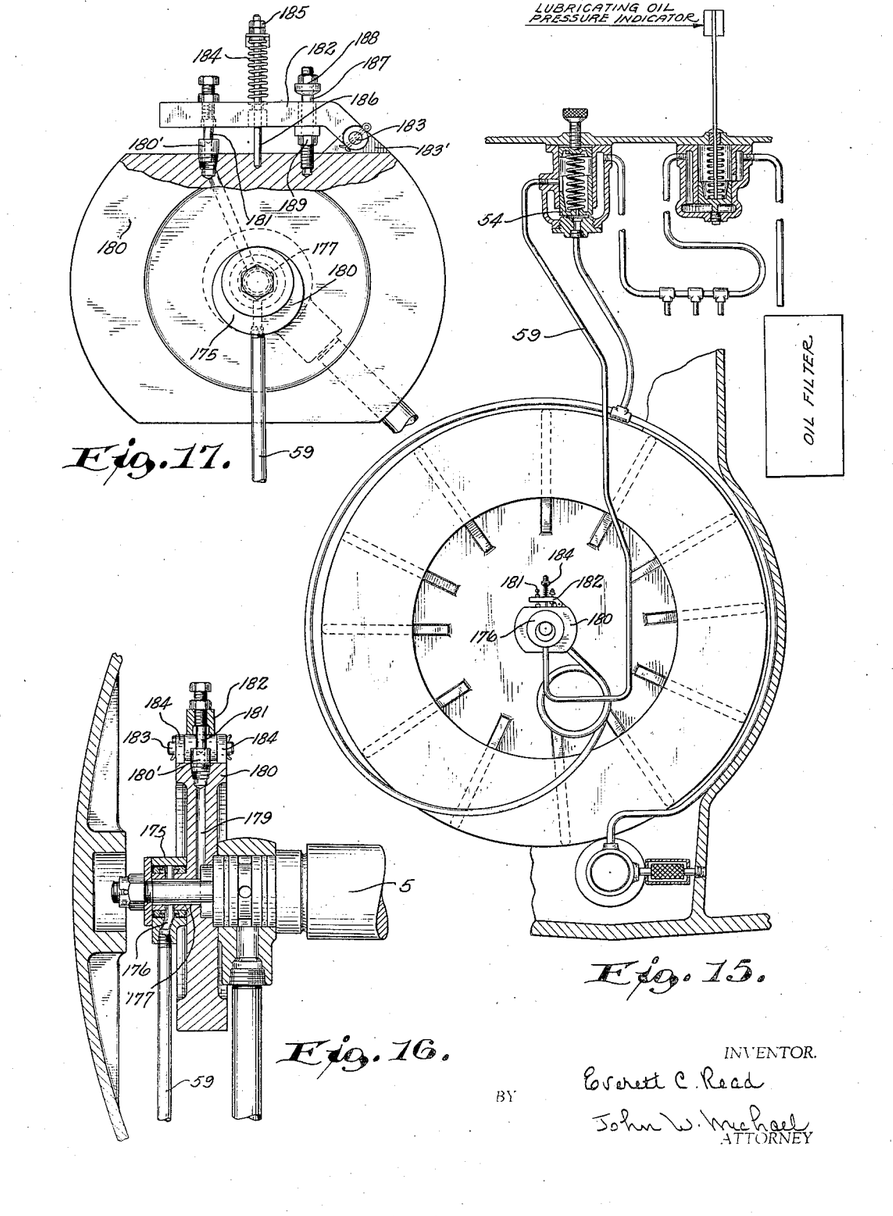
Figure 15 is a fragmentary view partly in side elevation and partly in longitudinal vertical section showing a still further modification of the invention.
Figure 16 is a view taken on line 16—16 of Figure 15 and looking in the direction of the arrows.
Figure 17 is a view on an enlarged scale of the control device applied to the end of the crank shaft in the form of the invention shown in Figures 15 and 16.

In the construction described, the speed of the engine can be changed while the engine is running by the adjustments provided. Many of the advantages of the invention, in fact all of them except the advantage of being able to change the speed without stopping the engine, may be realized with a much simpler construction than those described. Such a simplified construction is illustrated in Figures 15, 16 and 17. As there shown, the pressure above the poppet valve 54 instead of being regulated by a fly ball governor and a relief arrangement such as the relief valve arrangement 60, or by a system such as is shown in Figures 12 to 14 inclusive, is controlled in a much simpler fashion. In the structure shown in Figures 15 and 16 the pipe line 59 which leads from the top side of the poppet valve 54 is connected to a distributing ring or manifold ring 175 which encircles or surrounds a portion of the shaft 5 and is suitably packed thereto. Passageways 176 and 177 provided in and by ring 175 provide for free communication between pipe 59 and a radial passage 179 in a collar 180 fixed to the shaft 5 to rotate therewith. A valve seat 180' is threadedly interconnected with the outer end of the radial passage. A needle valve 181 coacts with the valve seat and is adjustably connected to an arm 182 pivotally attached at 183 to ears 183' integral with the collar. The arm 182 is biased to a position wherein the valve 181 engages its seat 180' by means of a spring 184 interposed between the arm and a head or abutment 185 adjustably connected to a stud 186 passing through an opening in the arm 182 and attached at its inner end to the collar 180. A second stud 187, which extends through an opening in the arm 182 and is fastened to the collar 180, is provided with adjustable stops 188 and 189 to limit the movement of the arm 182 in either direction.

With this construction, by adjusting the abutment 185 for the spring 184, the tension of the spring is changed and the speed of the engine may be varied and determined. If the engine tends to exceed the selected speed, the arm 182 swings outwardly under the influence of centrifugal force to open valve 181 and relieve the oil pressure above the poppet valve 54, consequently decreasing the pressure in the fluid pressure motor 21 and allowing centrifugal force to decrease the cut-off. On the other hand, if the speed falls off, the valve 181 closes, thereby increasing the pressure above the poppet valve 54 and consequently increasing also the pressure acting on the fluid pressure motor 21 to cause the motor 21 to shift the eccentric to advance or increase the cut-off correspondingly.

While I have shown and described several constructions in which the invention may be advantageously embodied, it is to be understood that the constructions shown have been selected merely for the purpose of illustration or example and that various changes in the size, shape and arrangement of the parts may be made without departing from the spirit of the invention or the scope of the subjoined claims.

The invention claimed is:

1. A governor for engines of the type having an engine shaft actuated distributing valve gear including a shiftable eccentric sheave mounted on the engine shaft and weighted so as to be shifted with respect thereto under the influence of centrifugal force to decrease the cut-off and comprising a fluid pressure motor operatively interposed between the shaft and the sheave and acting when supplied with fluid under pressure to cause the sheave to shift with respect to the shaft to advance the cut-off, and means for varying the pressure of the fluid supplied to said motor.

2. A governor of the type having an engine shaft actuated distributing valve gear including a shiftable eccentric sheave mounted on the engine shaft and weighted so as to be shifted with respect thereto under the influence of centrifugal force to decrease the cut-off and comprising a fluid pressure motor operatively interposed between the shaft and the sheave and acting when supplied with fluid under pressure to cause the sheave to shift with respect to the shaft to advance the cut-off, means for varying the pressure of the fluid supplied to said motor, and a speed responsive device driven in timed relation to the engine and regulating the action of said last named means.

3. A governor of the type having an engine shaft actuated distributing valve gear including a shiftable eccentric sheave mounted on the engine shaft and weighted so as to be shifted with respect thereto under the influence of centrifugal force to decrease the cut-off and comprising a fluid pressure motor operatively interposed between the shaft and the sheave and acting when supplied with fluid under pressure to cause the sheave to shift with respect to the shaft to advance the cut-off, means for supplying fluid under pressure to said motor, and a pressure responsive device subjected to the back pressure of the engine and regulating the pressure of the fluid supplied to said motor.

4. A governor of the type having an engine shaft actuated distributing valve gear including a shiftable eccentric sheave mounted on the engine shaft and weighted so as to be shifted with respect thereto under the influence of centrifugal force to decrease the cut-off and comprising a fluid pressure motor operatively interposed between the shaft and the sheave and acting when supplied with fluid under pressure to cause the sheave to shift with respect to the shaft to advance the cut-off, means for supplying fluid under pressure to said motor, and a control device subjected and responsive to a characteristic of the performance of the engine which varies as a function of the load and regulating the pressure of the fluid supplied to said motor.

5. A governor for engines of the type having an engine shaft actuated distributing valve gear including a shiftable eccentric sheave mounted on the engine shaft and weighted so as to be shifted with respect thereto under the influence of centrifugal force to decrease the cut-off and comprising a fluid pressure motor operatively interposed between the shaft and the sheave and acting when supplied with fluid under pressure to cause the sheave to shift with respect to the shaft to advance the cut-off, means for supplying fluid under pressure to said motor, pressure relief means for said fluid pressure supply means, and a control device subjected and responsive to at least one characteristic of the performance of the engine which varies as a function of the load regulating the action of said pressure relief means.

6. A governor for engines of the type having an engine shaft actuated distributing valve gear including a shiftable eccentric sheave mounted on the engine shaft and weighted so as to be shifted with respected thereto under the influence of centrifugal force to decrease the cut-off and comprising a fluid pressure motor operatively interposed between the shaft and the sheave and acting when supplied with fluid under pressure to cause the sheave to shift with respect to the shaft to advance the cut-off, means for supplying fluid under pressure to said motor, pressure relief means connected to said fluid pressure supply means, a speed responsive device driven in timed relation to the engine, a pressure responsive device subjected to the back pressure of the engine, and means utilizing the conjoint action of the speed responsive device and pressure responsive device for regulating the action of said pressure relief means.

7. A governor for engines of the type having an engine shaft actuated distributing valve gear including a shiftable eccentric sheave mounted on the engine shaft and weighted so as to be shifted with respect thereto under the influence of centrifugal force to decrease the cut-off and comprising a fluid pressure motor operatively interposed between the shaft and the sheave and acting when supplied with fluid under pressure to cause the sheave to shift with respect to the shaft to advance the cut-off, a pump, means connecting the pump with the motor, a pressure regulating valve having one side connected to said last named means, an oil relief valve connected to the other side of the pressure regulating valve, and a speed responsive device driven in timed relation to the engine for controlling the opening and closing of the oil relief valve.

8. A governor for engines of the type having an engine shaft actuated distributing valve gear including a shiftable eccentric sheave mounted on the engine shaft and weighted so as to be shifted with respect thereto under the influence of centrifugal force to decrease the cut-off and comprising a fluid pressure motor operatively interposed between the shaft and the sheave and acting when supplied with fluid under pressure to cause the sheave to shift with respect to the shaft to advance the cut-off, a pump, means connecting the pump with the motor, a pressure regulating valve having one side connected to said last named means, an oil relief valve connected to the other side of the pressure regulating valve, and a pressure responsive device subjected to the back pressure of the engine and connected to said oil relief valve for opening and closing the same.

9. A governor for engines of the type having an engine shaft actuated distributing valve gear including a shiftable eccentric sheave mounted on the engine shaft and weighted so as to be shifted with respect thereto under the influence of centrifugal force to decrease the cut-off and comprising a fluid pressure motor operatively interposed between the shaft and the sheave and acting when supplied with fluid under pressure to cause the sheave to shift with respect to the shaft to advance the cut-off, a pump, means connecting the pump with the motor, a pressure regulating valve having one side connected to said last named means, an oil relief valve connected to the other side of the pressure regulating valve, a speed responsive device driven by the engine, a pressure responsive device subjected to the back pressure of the engine, and means utilizing the conjoint action of said devices for opening and closing the oil relief valve.

10. A governor for engines having an engine shaft actuated distributing valve gear of the type including a shiftable eccentric sheave and comprising means for pivotally interconnecting the sheave and the shaft, means for causing the sheave to shift inwardly relative to the engine shaft under the influence of centrifugal force, a governor spring interconnecting the shaft and the sheave and opposing the action of centrifugal force, a fluid pressure motor effective when energized to force the sheave outwardly and including the usual motor elements, namely, a piston and a cylinder, one connected to the shaft and the other connected to the sheave, and means for regulating the pressure of the fluid supplied to said motor.

11. A governor for engines having an engine shaft actuated distributing valve gear of the type including a shiftable eccentric sheave and comprising means for pivotally interconnecting the sheave and the shaft, means for causing the sheave to shift inwardly relative to the engine shaft under the influence of centrifugal force, a governor spring interconnecting the shaft and the sheave and opposing the action of centrifugal force, a fluid pressure motor effective when energized to force the sheave outwardly and including the usual motor elements, namely, a piston and a cylinder, one connected to the shaft and the other connected to the sheave, means for regulating the pressure of the fluid supplied to said motor, a control device subjected and responsive to a characteristic of the performance of the engine which varies as a function of the load and regulating the action of said last named means.

12. A governor for engines having an engine shaft actuated distributing valve gear of the type including a shiftable eccentric sheave and comprising means for pivotally supporting the sheave on the engine shaft, means for causing the sheave to shift inwardly relatively to the engine shaft under the influence of centrifugal force, a fluid pressure motor interposed between the sheave and shaft and including a cylinder fixed to the shaft, a piston fitted in the cylinder and a link interconnecting the piston and the sheave, and means for regulating the pressure of the fluid supplied to the motor.

13. A governor for engines having an engine shaft actuated distributing valve gear of the type including a shiftable eccentric sheave and comprising means for pivotally interconnecting the eccentric sheave and the engine shaft, means for causing the sheave to shift inwardly relative to the engine shaft under the influence of centrifugal force to decrease the cut-off, a fluid pressure motor including a cylinder rigid with the shaft, a piston fitted in the cylinder and interconnected with the sheave, and means for regulating the pressure of the fluid supplied to the motor.

14. A governor for the valve gear of a steam engine having an eccentric pivotally supported with respect to the main shaft of the engine and swingable to decrease the cut-off thereof under the influence of centrifugal force and comprising a fluid pressure motor interposed between the eccentric and the main shaft and operable to oppose the action of centrifugal force, and means responsive to conditions to be served for regulating the pressure of the fluid supplied to said motor.

15. A governor for the valve gear of a steam engine of the type having an eccentric swingably supported with respect to the main shaft of the engine to vary the cut-off of the engine and comprising means for causing the eccentric to swing under the influence of centrifugal force to decrease the cut-off, a fluid pressure motor interposed between the eccentric and the main shaft and operable to move the eccentric to advance the cut-off, and speed responsive means for regulating the pressure of the fluid supplied to said motor.

16. A governor for engines of the type having an eccentric pivotally supported on the main shaft and comprising means associated with the eccentric for causing it to swing with respect to the main shaft under the influence of centrifugal force, a torsion spring interconnected with the main shaft and the eccentric and opposing the action of centrifugal force, and a hydraulic relay operatively interconnected with the eccentric and supplementing the action of said torsion spring.

17. A governor of the type having an eccentric shiftably supported with respect to the main shaft of the engine, and comprising means for causing the eccentric to shift inwardly with respect to the shaft under the influence of centrifugal force, a governor spring interconnecting the shaft and the eccentric and opposing the action of centrifugal force, a fluid pressure motor interposed between the eccentric and the main shaft and operable to move the eccentric outwardly with respect to the shaft, and means for regulating the pressure of the fluid supplied to said motor.

18. A governor of the character described for engines having a main shaft and an eccentric fulcrumed on the main shaft and swingable inwardly with respect thereto under the influence of centrifugal force, and comprising an inertia wheel loosely mounted on the main shaft, a connection between the inertia wheel and the eccentric, a torsion spring between the inertia wheel and the shaft, a fluid pressure motor interconnecting the main shaft and the eccentric, and means for regulating the pressure of the fluid supplied to said motor.

19. A governor of the character described for engines having a main shaft and an eccentric fulcrumed on the main shaft and weighted so as to be swingable inwardly with respect thereto under the influence of centrifugal force to decrease the cut-off and comprising an inertia wheel having its hub rotatably fitted on the shaft, a collar fixed to the shaft, a torsion spring encircling the hub of the eccentric and having one end interconnected with the collar and its other end interconnected with said inertia wheel, an operative connection between the inertia wheel and the eccentric, a fluid pressure motor operatively interposed between the eccentric and the main shaft and acting when supplied with fluid under pressure to shift the eccentric outwardly, and means for varying the pressure of the fluid supplied to said motor.

20. A governor for the valve gear of a steam engine having an element shiftable under the influence of centrifugal force to vary the action of the valve gear, a fluid pressure motor interconnected with said element and opposing the action of centrifugal force, means for supplying said motor with fluid under pressure, pressure relief means connected to said fluid pressure supply means, and a control device subjected and responsive to at least one characteristic of the performance of the engine which varies as a function of the load regulating the action of said pressure relief means.

21. A governor for engines of the type having an engine shaft actuated distributing valve gear including a shiftable eccentric sheave mounted on the engine shaft and weighted so as to be shifted with respect thereto under the influence of centrifugal force to decrease the cut-off and comprising a fluid pressure motor operatively interposed between the shaft and the sheave and acting when supplied with fluid under pressure to cause the sheave to shift with respect to the shaft to advance the cut-off, means for supplying fluid under pressure to said motor, pressure relief means for said fluid pressure supply means, and a control device subjected and responsive to at least one characteristic of the performance of the engine which varies as a function of the load regulating the action of said pressure relief means, in combination with an overspeed safety device comprising an auxiliary pressure relief means operatively interrelated with said fluid pressure means, a device for normally maintaining said auxiliary pressure relief means inoperative, and a speed responsive device driven in timed relation to the engine and set into operation upon a predetermined over-speed of the engine for releasing said device and providing for the operation of said auxiliary pressure relief means.

22. A governor of the character described for engines having a main shaft and an eccentric fulcrumed on the main shaft and weighted so as to be swingable inwardly with respect thereto under the influence of centrifugal force and comprising an inertia wheel loosely mounted on the main shaft, a connection between the inertia wheel and the eccentric, a torsion spring between the inertia wheel and the shaft, a fluid pressure motor interconnecting the main shaft and the eccentric, means for supplying fluid under pressure to said motor, pressure relief means connected to said fluid pressure supply means, a control device subjected and responsive to a characteristic of the performance of the engine which varies as a function of the load and regulating the action of said pressure relief means, in combination with an over-speed safety cut-off including an auxiliary pressure relief means operatively interrelated with the fluid pressure supply means, a device for normally maintaining said auxiliary pressure relief means inoperative and including a latch disposed adjacent the inertia wheel, and a speed responsive trip mounted on the inertia wheel and cooperable with the latch for releasing the same when the engine runs at a pre-determined overspeed.

23. An engine having an engine shaft actuated distributing valve gear of the type including a shiftable eccentric sheave and comprising means for pivotally interconnecting the sheave and the shaft, means for causing the sheave to shift inwardly relative to the engine shaft under the influence of centrifugal force, a fluid pressure motor including the usual motor elements, namely, a piston and a cylinder, one connected to the shaft and the other connected to the sheave, a pump, means connecting the pump to the motor including a conduit between the pump and the shaft, and passages in the shaft leading into the motor, said shaft and associated instrumentalities having lubricant conveying devices through which oil flows from the motor to surfaces to be lubricated, said lubricant conveying devices providing for restricted flow of oil from the motor, said conduit having a branch, a pressure regulating valve having one side connected to the branch, an oil relief valve connected to the other side of the pressure regulating valve, and a control device subjected and responsive to at least one characteristic of the performance of the engine which varies as the function of the load for controlling the oil relief valve.

24. An engine having an engine shaft actuated distributing valve gear of the type including a shiftable eccentric sheave and comprising means for pivotally interconnecting the sheave and the shaft, means for causing the sheave to shift inwardly relative to the engine shaft under the influence of centrifugal force, a fluid pressure motor including the usual motor elements, namely, a piston and a cylinder, one connected to the shaft and the other connected to the sheave, a pump, means connecting the pump to the motor including a conduit between the pump and the shaft, and passages in the shaft leading into the motor, said shaft and associated instrumentalities having lubricant conveying devices through which oil flows from the motor to surfaces to be lubricated, said lubricant conveying devices providing for restricted flow of oil from the motor, said conduit having a branch, a pressure regulating valve having one side connected to the branch, an oil relief valve connected to the other side of the pressure regulating valve, and a control device subjected and responsive to at least one characteristic of the performance of the engine which varies as the function of the load for controlling the oil relief valve, lubricant conveying devices extending to oiling points in the engine and having a main conduit connected to said pressure regulating valve and communicating with the said branch when said valve is open.

25. An engine of the character described having a valve gear, a governor for the valve gear, including an element shiftable under the influence of centrifugal force to vary the action of the valve gear, a fluid pressure motor interconnected with said element and opposing the action of centrifugal force, means for supplying said motor with fluid under pressure, lubricant conveying devices controlling the exhaust of fluid under pressure from the motor and distributing the lubricant exhausted from the motor to surfaces of the engine to be lubricated, said lubricant conveying devices providing for restricted discharge of oil from the motor, pressure relief means connected to said fluid pressure supply means, and a control device subjected and responsive to at least one characteristic of the performance of the engine which varies as a function of the load for regulating the action of said pressure relief means.

26. An engine of the character described having a valve gear, a governor for the valve gear, including an element shiftable under the influence of centrifugal force to vary the action of the valve gear, a fluid pressure motor interconnected with said element and opposing the action of centrifugal force, means for supplying said motor with fluid under pressure, lubricant conveying devices controlling the exhaust of fluid under pressure from the motor and distributing the lubricant exhausted from the motor to surfaces of the engine to be lubricated, said lubricant conveying devices providing for restricted discharge of oil from the motor, pressure relief means connected to said fluid pressure supply means, a control device subjected and responsive to at least one characteristic of the performance of the engine which varies as a function of the load for regulating the action of said pressure relief means, and lubricant conveying devices extending to surfaces of the engine to be lubricated and connected to said pressure relief means and supplied with lubricant therefrom as an incident to the operation thereof.

27. An engine of the character described having a valve gear, a governor for the valve gear, including an element shiftable under the influence of centrifugal force to vary the action of the valve gear, a fluid pressure motor interconnected with said element and opposing the action of centrifugal force, means for supplying said motor with fluid under pressure, pressure relief means connected to said fluid pressure supply means, a control device subjected and responsive to at least one characteristic of the performance of the engine which varies as a function of the load for regulating the action of said pressure relief means, and lubricant conveying devices extending to surfaces of the engine to be lubricated and connected to said pressure relief means and supplied with lubricant therefrom as an incident to the operation thereof.

28. A governor for the valve gear of a steam engine having an element shiftable under the influence of centrifugal force to vary the action of the valve gear, a fluid pressure motor interconnected with said element and opposing the action of centrifugal force, means for supplying said motor with fluid under pressure, pressure relief means connected to said fluid pressure supply means and including a spring loaded pressure relief valve, and means for varying the pressure on the discharge side of said valve in accordance with changes in engine speed.

29. In combination with a governor system for the valve gear of a steam engine having an element shiftable under the influence of centrifugal force to vary the action of the valve gear and including a fluid pressure motor interconnected with said element and opposing the action of centrifugal force, means for supplying said motor with fluid under pressure, and pressure relief means connected to said fluid pressure supply means, a lubricating system including lubricant conveying devices extending to the bearing surfaces of the engine to be lubricated and interconnected with the pressure relief means and the motor so as to be supplied with lubricant therefrom, whereby in the event the pressure under which lubricant is supplied to said surfaces fails the engine will automatically idle.

30. In combination with a governor system for the valve gear of a steam engine having an element shiftable under the influence of centrifugal force to vary the action of the valve gear and including a fluid pressure motor interconnected with said element and opposing the action of centrifugal force, means for supplying said motor with fluid under pressure, and pressure relief means connected to said fluid pressure supply means, a lubricating system for the engine having lubricant conveying devices extending to the bearing surfaces of the engine to be lubricated, and connections between the lubricant conveying devices and the governing system whereby the lubricant is supplied to the lubricating system from the governing system.

31. As a governor for the valve gear of a steam engine having an element shiftable under the influence of centrifugal force to vary the action of the valve gear, a fluid pressure motor interconnected with said element and opposing the action of centrifugal force, means for supplying said motor with fluid under pressure, and pressure relief means connected to said fluid pressure supply means.

32. A governor for the valve gear of a steam engine having an element shiftable under the influence of centrifugal force to vary the action of the valve gear, a governor spring interconnecting the shaft and the element and opposing the action of centrifugal force, a fluid pressure motor interconnected with said element and said shaft and also opposing the action of centrifugal force, and means for regulating the pressure of the fluid supplied to said motor.

EVERETT C. READ.